Patented July 8, 1952

2,602,783

UNITED STATES PATENT OFFICE 2,602,783

CELLULAR FOAMED ALKYD-DIISOCYANATE RESINS

Eli Simon, Los Angeles, and Frank W. Thomas, Burbank, Calif., assignors to Lockheed Aircraft Corporation, Burbank, Calif.

No Drawing. Application January 14, 1949, Serial No. 71,037

11 Claims. (Cl. 260—2.5)

This invention relates to the manufacture of formed cellular plastic materials and relates more particularly to the manufacture of improved cellular foamed alkyd resin-diisocyanate plastics incorporating or employing diisocyanate resinous addition agents.

In our co-pending applications Serial No. 35,294 filed June 25, 1948, now Patent 2,577,279; Serial No. 44,993, filed August 18, 1948, now abandoned; Serial No. 50,007, filed September 18, 1948, now Patent 2,577,280; and Serial No. 54,822, filed October 15, 1948, now Patent 2,577,281, we have disclosed methods and formulations for making low density cellular foamed plastics in which the component ingredients may be simply mixed together and poured into a cavity or the like to react at atmospheric pressure so as to assume a foamed cellular state and so as to directly and immediately bond with the walls of the cavity. The low density of these materials coupled with their other desirable physical characteristics and the easy manner in which they may be produced and used, adapts them for numerous applications in the field of aviation, electrical equipment, etc. As described in our earlier applications for Letters Patent above referred to, the foamed cellular materials were obtained by reacting an alkyd resin and a poly-isocyanate mixture at atmospheric pressure, obtaining an effective foam producing action by controlling the water content and/or by the mode in which the water is incorporated in the reactant mixture and/or by the employment of additives such as metallic leafing powders or metallic soap powders.

We have discovered that improved cellular foamed alkyd-diisocyanate plastics may be prepared by employing high molecular weight poly-isocyanate reaction products in the formulations for the cellular foamed materials instead of the unmodified diisocyanate or together with the unmodified diisocyanate. By appropriately utilizing these high molecular weight poly-isocyanate reaction products in the primary formulations we obtain a more stable foaming reaction with less tendency for the cells to collapse even in pourings or masses of large cross section, reduce the mixing time required and therefore lessen the tendency for premature reaction, and obtain a foamed cellular plastic material of improved physical characteristics. When a high molecular weight poly-isocyanate reaction product is used in the formulation, the isocyanate is more compatible with the alkyd resin so that less mixing time is required and, therefore, there is less tendency toward premature reaction. It is, therefore, an object of the present invention to provide formulations for producing improved foamed cellular plastic materials.

The employment of the high molecular weight resinous poly-isocyanate reaction products as the sole source of isocyanate groups for coupling with an alkyd resin in the preparation of the cellular foamed plastic, or the dilution or blending of such a resinous poly-isocyanate reaction product with a substantially pure diisocyanate, for use in the alkyd resin-diisocyanate reactant mixture, has been found to produce foamed plastic having very small uniform cells thereby improving the physical properties of the product. The cells may be $\frac{1}{16}$ inch or less in diameter, being much smaller than the cells obtained when the resinous, high molecular weight, poly-isocyanate addition agent is not used. The smaller cell size imparts higher compressive strength to the foamed material, improves the thermal insulating properties, and improves the shock resistance, flexibility and vibration resistance. Furthermore, in the product having the small uniform cells there is essentially no notch effect whereas with the foamed plastics having the large cells the rupture of the boundary cell adversely affects not only an appreciable portion of the material due to a decrease in the load carrying area but, due to the large size of the ruptured cell, also produces a notch effect which materially lowers the strength characteristics of the material. It is, therefore, another object of the invention to provide a foamed cellular plastic material characterized by uniform cells of small diameter and possessing improved physical characteristics.

The foregoing advantages are obtained with no increase in weight, that is without increasing the density of the foamed cellular plastic products.

The invention provides high molecular weight poly-isocyanate resinous addition agents for use in the production of cellular foamed alkyd-diisocyanate plastics and more specifically is concerned with the resinous reaction products of meta-toluene diisocyanate and compounds having more than one functional group or radical each of which contains at least one labile hydrogen atom that will react with the meta-toluene diisocyanate by addition polymerization and is concerned with the use of such reaction products in the formulation of the foamed cellular plastic materials. The method of the invention comprehends generally the preparation or mixing of an alkyd resin and a meta-toluene diisocyanate resinous addition agent, of the type just referred to, employed either individually with the alkyd resin or in conjunction with pure meta-toluene diisocyanate and the alkyd resin. Further, the invention comprehends, when desired, the incorporation in the reactant mixture of a metallic soap powder or a metallic leafing powder or in place of the metallic soap powder or leafing powder, the reactant mixture may further include addition agents which act as fire retardants. In each case the reactant mixture is poured or applied after suitable mixing and is allowed to react at atmospheric pressure with or without the application of external heat and with or without a post-curing at somewhat elevated temperatures.

The resins which we prefer to employ in the formulations and method are the reaction products of polyhydric alcohols and polybasic acids unmodified or modified with oil and/or other resins, having an acid number of from 5 to 80, a water content of from 0.1% to 3.0% by weight and having the following ratio range of the hydroxyl groups to the carboxyl groups in the reactants of the alkyd resins:

From 3 hydroxyl (OH) : 1 carboxyl (COOH)
To 4 hydroxyl (OH) : 5 carboxyl (COOH).

It has been found desirable to employ resins having an acid number between approximately 10 and approximately 25 and wherein the ratio of the hydroxyl groups to the carboxyl groups is 2 to 1 although satisfactory results have been obtained by employing resins having the foregoing ranges of acid numbers and ratios of the hydroxyl to carboxyl groups in their reactants. The following formulae have been found to be suitable for preparing unmodified alkyd resins from polyhydric alcohols and polybasic acids. Formula A yields a resin having an acid number of from 5 to 80, preferably approximately 15, and a water content of about 0.3% by weight.

*Formula A*

| | Mols |
|---|---|
| Glycerol | 4 |
| Adipic acid | 2.5 |
| Phthalic anhydride | 0.5 |

*Formula B*

| | Mols |
|---|---|
| Glycerol | 2 |
| 1,4 Butylene glycol | 1 |
| Adipic acid | 2 |

*Formula C*

| | Mols |
|---|---|
| Trimethylol propane | 4 |
| Adipic acid | 2.5 |
| Phthalic anhydride | 0.5 |

*Formula D*

| | Mols |
|---|---|
| Glycerol | 2 |
| Pentaerithritol | 0.5 |
| Phthalic anhydride | 1 |
| Sebacic acid | 3 |

Excellent results have been obtained by employing the resin of Formula A having an acid number of 16 and a water content of 0.56% by weight and by employing the resin of Formula C having an acid number of 20 and a water content of 0.85% by weight. The ratios of the hydroxyl groups to the carboxyl groups of the alkyd resin reactants in Formulae A, B, C and D are respectively 2(OH) : 1(COOH), 2(OH) : 1(COOH), 2(OH) : 1(COOH), and 1(OH) : 1(COOH). In Formula A the range of proportions may be from 3 to 5 mols of glycerol, from 1.5 to 3 mols adipic acid, from 0.1 to 1.5 mols phthalic anhydride and in Formula C the practical operative range of proportions is from 3 to 5 mols trimethylol propane, from 1.5 to 3 mols adipic acid and from 0.1 to 1.5 mols phthalic anhydride.

The following Formulae E, F and G are typical or representative of formulae for preparing unmodified alkyd resins from single polyhydric alcohols and single polybasic acids producing resins suitable for use in the method and products of the invention:

*Formula E*

| | Mols |
|---|---|
| Glycerol | 4 |
| Adipic acid | 3 |

*Formula F*

| | Mols |
|---|---|
| Trimethylol propane | 3 |
| Phthalic anhydride | 2 |

*Formula G*

| | Mols |
|---|---|
| Glycerol | 1 |
| Phthalic anhydride | 1.5 |

The respective ratios of the hydroxyl groups to the carboxyl groups of the alkyd resin reactants of Formulae E, F and G are 2(OH) : 1(COOH), 9(OH) : 4(COOH) and 1(OH) : 1(COOH).

Formulae H and I are examples of alkyd resins, oil modified, that have been found to be practical and operative in preparing the foamed cellular plastic materials in accordance with the present invention. The respective ratios of the hydroxyl groups to the carboxyl groups in the alkyd resin reactants of these formulae are 3(OH) : 3½(COOH) and 6(OH) : 7(COOH).

*Formula H*

| | Mols |
|---|---|
| Glycerol | 1 |
| Phthalic anhydride | 1.5 |
| Oleic acid | 0.5 |

*Formula I*

| | Mols |
|---|---|
| Diethylene glycol | 5 |
| Adipic acid | 5 |
| Citric acid | 1 |
| Lactic acid | 1 |

Another example of an oil modified alkyd resin which we have found to be practical and effective in preparing the foamed cellular plastic material is found in Formula J where the ratio of the hydroxyl and carboxyl groups of the alkyd resin reactants is 10½(OH) : 9(COOH) and where the (OH) group in the ricinoleic acid, or the 3(OH) groups for the castor oil molecule, is taken into account or 7½(OH) : 9(COOH) when the (OH) groups in the ricinoleic acid is not considered.

*Formula J*

| | Mols |
|---|---|
| Glycerol | 2.5 |
| Adipic acid | 4 |
| Castor oil | 1 |
| Maleic anhydride | ½ |

An example of a natural resin modified alkyd resin suitable for incorporation in the cellular foamed plastics of the invention is set forth in Formula K where the ratio of the hydroxyl to the carboxyl groups of the alkyd resin reactants is 1(OH) : 1(COOH).

Formula K

| | | |
|---|---|---|
| Glycerol | gram mol | 1 |
| Sebacic acid | gram mols | 1½ |
| Resin copal | grams | 100 |

An example of a synthetic resin modified alkyd resin adapted for use in the formulations and method of the invention is set forth in Formula L where the ratio of the hydroxyl groups to the carboxyl groups of the alkyd resin reactants is 3(OH) : 2(COOH).

Formula L

| | |
|---|---|
| Phenol | 50 grams |
| Formaldehyde | 17 grams |
| Rosin | 65 grams |
| Phthalic anhydride | 30 grams or 0.2 gram mol |
| Glycerol | 18.4 grams or 0.2 gram mol |

We have found that the most satisfactory results are obtained when the water content range of the alkyd resin component or components of the diisocyanate alkyd resin reactant mixture is from 0.1% to 3.0% by weight without regard to the specific manner of incorporating the water in the mixture. In the typical formulae and examples herein set forth it will be considered that the water component ($H_2O$) of the diisocyanate alkyd resin reactant mixture is incorporated by dissolving a calculated amount of the water in the selected alkyd resin and suitably agitating the resin-water mixture so that the alkyd resin component will contain the selected proportion of water. However, as set forth in our co-pending application, Serial No. 35,294, now Patent No. 2,577,279 the water may be incorporated in the reactant mixture in combination with a non-ionic wetting agent or by the use of one or more metallic salt hydrates.

The isocyanate employed in preparing the above mentioned resinous addition agents for use in the reactant foam producing mixture is preferably meta-toluene diisocyanate. The addition agents are the reaction products of meta-toluene diisocyanate and compounds having more than one functional group or radical, each of said groups or radicals containing at least one labile hydrogen atom that will react with the meta-toluene diisocyanate by addition polymerization. In other words, the addition agents are the reaction products of addition polymerization between meta-toluene diisocyanate and polyfunctional molecules, each functional group containing at least one labile hydrogen atom. The reaction is preferably carried out in an excess of the meta-toluene diisocyanate to produce a resinous viscous product readily compatible with the alkyd resins of the reactant mixture. The degree of reaction is controlled by amine equivalent determinations, the amine equivalent being defined in this application as the number of grams of an isocyanate consumed by one gram mol of a secondary amine in the formation of the corresponding urea. Thus the theoretical amine equivalent of chemically pure meta-toluene diisocyanate is 87, as shown by the following reactions:

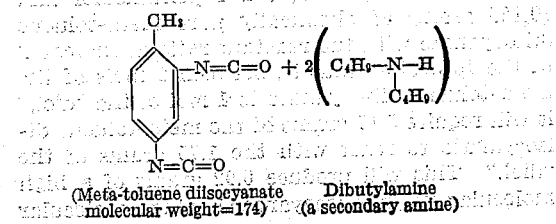
(Meta-toluene diisocyanate molecular weight=174)  Dibutylamine (a secondary amine)

or

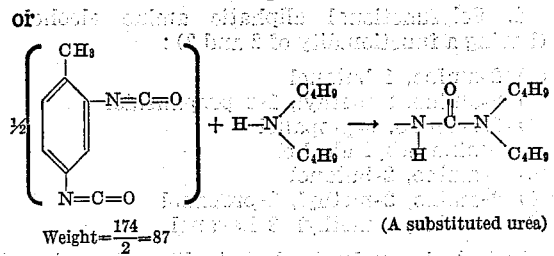
Weight = $\frac{174}{2}$ = 87

(A substituted urea)

When the resinous, high molecular weight diisocyanate is to be used as an addition agent to substantially chemically pure meta-toluene diisocyanate, it is preferred to prepare it by reacting two mols of chemically pure meta-toluene diisocyanate with one mol of a polyfunctional compound to a polymerization degree such that when diluted with the un-reacted meta-toluene diisocyanate, the resulting solution has an amine equivalent of between 100 and 175 with an amine equivalent of between 100 and 150 being preferred, as will be later described. The functionality of the compound to be reacted with the meta-toluene diisocyanate is considered as being governed by the number of groups per molecule that contain at least one labile hydrogen atom per group. The following compounds, included in groups 1 to 8 inclusive, which fall within the definition just given, are suitable for polymerization with the meta-toluene diisocyanate in the preparation of the addition agents:

1. Polyfunctional aliphatic alcohols—diols having a functionality of 2:

(1) 2 methyl, 2-4 pentanediol
(2) 1,4-hexanediol
(3) 1,5-pentanediol
(4) 1,7-heptanediol
(5) 1,4-heptanediol
(6) Ethylene glycol
(7) Diethylene glycol

*Illustration.*—In the case of 1,5-pentanediol HO—$(CH_2)_5$—OH each hydrogen atom of the hydroxy group is "labile" and will add to an isocyanate group. Therefore, the functionality of the molecule of 1,5-pentanediol is 2.

2. Polyfunctional phenols (having a functionality of 2 and 3):

(1) Resorcinol (m-dihydroxybenzene)
(2) Pyrocatechol (o-dihydroxyzenzene)
(3) Pyrogallol (trihydroxybenzene)

3. Bi-functional metallic soaps (having a functionality of 2):

These compounds may be represented by the formula:

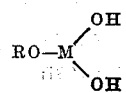

where R = a fatty acid residue such as stearate, palmitate, oleate and laurate, and M = a metal having a valency greater than 2, such as aluminum, tin and bismuth.

Examples of such bi-functional metallic soaps are:

(1) Aluminum monostearate
(2) Aluminum monooleate
(3) Aluminum monopalmitate
(4) Bismuth monostearate 4. Polyfunctional aliphatic amino alcohols (having a functionality of 2 and 3):

(1) 2-amino, 1-butanol
(2) 2-amino, 2-methyl, 1-3 propanediol
(3) 1,3-amino, 2-propanol
(4) Amino ethyl alcohol
(5) 4-amino, 2-butanol
(6) 2-amino, 2-methyl, 1-propanol
(7) 2-amino, 2-methyl, 3-hexanol It is to be understood that although amines, such as a primary amine, may theoretically contain more than one labile hydrogen atom, we do not herein, in determining the functionality, consider each replaceable hydrogen atom of the same group as being equivalent to a function of 1. On the other hand, as previously indicated, in the present description of the invention, we consider functionality in terms of groups rather than in terms of the total number of labile hydrogen atoms but in order for a group to be considered as functional it must contain at least one labile hydrogen atom. Thus in the case of 2-amino, 1-butanol

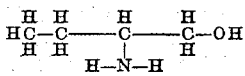

We speak of this compound as having a functionality of 2, there being two groups present, each group having at least one labile hydrogen atom. In a like manner, hexamethylene diamine

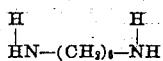

is considered as having a functionality of two rather than a functionality of four.

5. Polyfunctional aminophenols (having a functionality of 2):

(1) o-Aminophenol
(2) m-Aminophenol
(3) p-Aminophenol

6. Polyfunctional aliphatic amines (having a functionality of 2):

(1) Hexamethylene diamine
(2) Trimethylene diamine
(3) 1,3 diaminobutane
(4) Tetramethylene diamine 7. Polyfunctional aromatic amines (having a functionality of 2):

(1) m-Toluene diamine
(2) o-Phenylene diamine
(3) m-Phenylene diamine
(4) p-Phenylene diamine 8. Polyfunctional thio glycols (having a functionality of 2):

(1) Mono-thio glycols—(a) monothio-ethylene glycol—

(2) Di-thio glycols—(a) dithio-ethylene glycol—

While we do not wish to be restricted to any particular theory of operation, it appears that a high molecular weight retractive polyisocyanate is formed by the addition polymerization between a polyfunctional molecule (preferably bi-functional) of the above named classes of compounds and the meta-toluene diisocyanate. This is indicated by the following illustrative addition polymerization between meta-toluene diisocyanate and 2-methyl, 2,4-pentanediol:

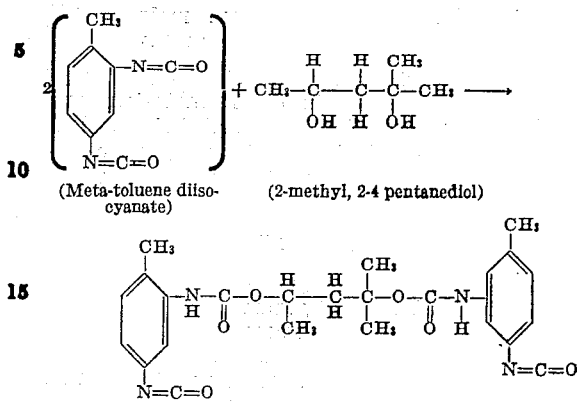

The reactive high molecular weight polyisocyanate is thought to be more compatible or more readily incorporated with the alkyd resins in the foam producing reaction because of the intervening somewhat polar aliphatic structure. Furthermore, when the high molecular weight reactive polyisocyanate is coupled with an alkyd resin, a higher molecular weight reaction product is immediately formed than would be the case when chemically pure meta-toluene diisocyanate is employed. It is believed that the formation of this higher molecular weight reaction product materially contributes to the more uniform foaming and especially to the production of small cells since it favors the entrapment of gas in the more viscous medium with the subsequent controlled expansion of the plastic mass so that the rate of blow more closely approximates the rate of cure of the foamed cellular plastic material. It is also believed that the resultant higher molecular weight reaction product between the resinous polyisocyanate and the alkyd resin has increased elasticity without loss in plasticity so that the cells that are formed are strengthened.

The reaction products of the mea-toluene diisocyanate and the polyfunctional molecules may replace entirely the unmodified meta-toluene diisocyanate in the alkyd-resin meta-toluene diisocyanate reactant mixtures or formulations of the character set forth in our co-pending applications above identified, or may be used in conjunction with or blended with the unmodified meta-toluene diisocyanate in the reactant mixtures. In either instance it is preferred that the resultant or total polyisocyanate reagent has an amine equivalent between 100 and 175 with the preferred range of the amine equivalency being between 100 and 150. The following is illustrative of the preparation of a modified diisocyanate of the invention adapted to be used as the sole source of diisocyanate in the alkyd-resin-diisocyanate reactant mixture for making the cellular foamed plastic material: In the reaction between 1.75 grams of 2-methyl, 2-4 pentanediol and 19,125 grams of chemically pure meta-toluene diisocyanate with the reactant ratio as indicated in the foregoing, that is, between 2 mols of the meta-toluene diisocyanate to 1 mol of the "diol," it will require 5.17 grams of the meta-toluene diisocyanate to react with the 1.75 grams of the "diol." This will produce 6.92 grams of a high molecular weight diisocyanate having a molecular weight of 466 or by the above definition an amine equivalent of 233. This reaction is as follows:

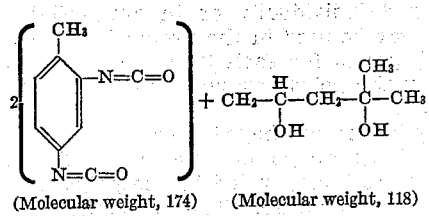

(Molecular weight, 174)   (Molecular weight, 118)

Thus: it will require (2×174), or 348 grams of meta-toluene diisocyanate to react with 118 grams of 2-methyl, 2-4 pentanediol or $$\frac{348 \times 1.75}{118} = 5.17 \text{ grams}$$

to react with the 1.75 grams of the "diol."

The unreacted meta-toluene diisocyanate is 13.96 grams, i. e. (19.125−5.17). The percentage by weight of the high molecular weight polyisocyanate reaction product is 33%, that is, $$\frac{6.92}{(1.75)+(19.125)} \times 100 = 33\%$$

The theoretical amine equivalent is $$(0.33 \times 233) + (0.67 \times 87) = 135$$

the amine equivalent of the chemically pure meta-toluene diisocyanate being 87, and that of the resinous reaction product being meta-toluene diisocyanate and 2-methyl, 2-4 pentanediol being 233. In an actual performance of this reaction the determined amine equivalent of the preparation was 145. The anaylsis was conducted by adding an excess of a 2 N solution of di-n-butylamine to a known weight of the resinous polyisocyanate and back titrating the excess di-n-butylamine, using bromphenol blue indicator, with a 1 N solution of hydrochloric acid.

Where the reaction product of the meta-toluene diisocyanate and the polyfunctional molecules is to be diluted or blended with unmodified meta-toluene diisocyanate to constitute the polyisocyanate reagent or ingredient of the polyisocyanate-alkyd resin reactant mixture, the reaction between the meta-toluene diisocyanate and the polyfunctional molecule compound is taken more nearly to completion to obtain a higher molecular weight polyisocyanate, that is a polyisocyanate having a higher amine equivalent. This reaction product is then diluted or blended with meta-toluene diisocyanate, preferably in a chemically pure state, to obtain a reagent having an amine equivalent of from 100 to 175, preferably an amine equivalent of between 100 and 150. An example of this type of reagent may be prepared from meta-toluene diisocyanate and 2-methyl, 2-4 pentanediol or other of the above named polyfunctional molecule compounds. Consider the polymerization between 2-methyl, 2-4 pentanediol and meta-toluene diisocyanate carried to an average polymer molecular weight of approximately 5,000, having terminal isocyanate groups, and represented by following illustrative reactions:

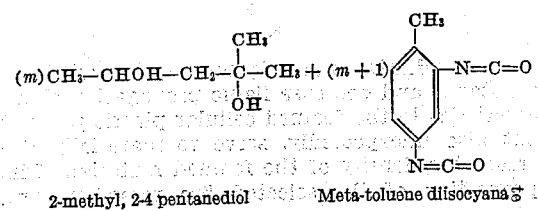

2-methyl, 2-4 pentanediol    Meta-toluene diisocyanate

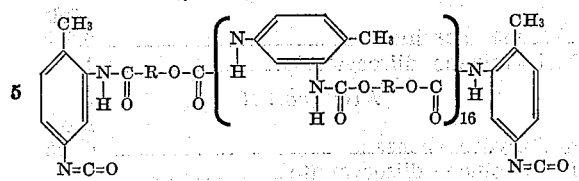

(Molecular weight = 5138)

where HO—R—OH represents a molecule of 2-methyl, 2-4 pentanediol.

Since this high molecular weight isocyanate has a molecular weight of 5138 and two isocyanate groups per molecule, then by previous definition, it has an amine equivalent of $$\frac{5138}{2} \text{ or } 2569$$

A very small percentage of such a high molecular weight reactive polyisocyanate suffices to provide the necessary modification of the amine equivalent. This technique also furnishes a convenient means of regulating the amine equivalent. Thus, at 1% by weight addition to meta-toluene diisocyanate, the resulting reagent has an amine equivalent of $$(2569 \times 0.01) + (87 \times 0.99) = 103.8$$

and on a 2% by weight addition basis the resultant reagent has an amine equivalent of 136.6.

The following examples of the modified polyisocyanate reagents contain sufficient proportions of the meta-toluene diisocyanate to be employed in the cellular foamed plastic reactant mixtures. The final polyisocyanate reagent comprises a solution of high molecular weight polyisocyanate reaction products in excess metal-toluene diisocyanate and may be prepared either as an integral solution, i. e., without further blending with unmodified meta-toluene diisocyanate, or prepared separately and then blended with cp meta-toluene diisocyanate, in each case the final blend having an amine equivalent of between 100 and 175, and preferably between 100 and 150, and being within the reactant range of proportions indicated, i. e., 0.01 to 0.25 mol polyfunctional reagent to one mol of unmodified meta-toluene diisocyanate.

*Example I*

| | Mols |
|---|---|
| 2 methyl, 2-4 pentanediol | 0.065 |
| Meta-toluene diisocyanate | 1 |

In Example I the permissible range of proportions is from 0.01 to 0.25 mol of the 2 methyl, 2-4 pentanediol per mol of the meta-toluene diisocyanate.

*Example II*

| | Mols |
|---|---|
| 2-amino, 2-methyl, 1-propanol | 0.065 |
| Meta-toluene diisocyanate | 1 |

*Example III*

| | Mols |
|---|---|
| 2-amino, 1-butanol | 0.065 |
| Meta-toluene diisocyanate | 1 |

*Example IV*

| | Mols |
|---|---|
| o-Dihydroxybenzene | 0.065 |
| Meta-toluene diisocyanate | 1 |

*Example V*

| | Mols |
|---|---|
| 1-3 diamino butane | 0.065 |
| Meta-toluene diisocyanate | 1 |

Example VI

|  | Mols |
|---|---|
| Toluene diamine | 0.065 |
| Meta-toluene diisocyanate | 1 |

Example VII

|  | Mols |
|---|---|
| m-Dihydroxybenzene | 0.065 |
| Meta-toluene diisocyanate | 1 |

In Examples II to VII inclusive, preferred proportions are set forth, however, the permissable ranges of proportions are the same as in Example I, namely from 0.01 to 0.25 mol of the poly-functional molecular compound for each mol of the meta-toluene diisocyanate.

As described and claimed in our co-pending application Serial No. 50,007, now Patent No. 2,577,280 the inclusion of a selected proportion of a metallic soap powder in the diisocyanate-alkyd resin reactant mixture produces superior results. The metallic soap powders which we have found to be effective and practical in the method and formulations of the invention are metallic soap powders of fatty acids having from 12 to 20 carbon atoms. Included in this class are:

Zinc stearate
Aluminum stearate
Calcium stearate
Magnesium stearate
Magnesium h y d r o x y stearate
Barium stearate
Zinc laurate
Calcium oleate
Strontium stearate The proportion of the metallic soap powder employed may be varied considerably. Thus, it has been found that from $\frac{1}{8}$ gram to 7½ grams of the selected metallic soap powder may be used for each 30 grams of the alkyd resin in the diisocyanate-alkyd resin reactant mixture.

As set forth in our co-pending application, Serial No. 44,993, filed August 18, 1948 and now abandoned, we have discovered that the incorporation of metallic leafing powders in the alkyd resin-polyisocyanate mixture, results in a foamed cellular plastic product of superior physical properties. The leafing powders must have the property of leafing when suspended in a suitable liquid vehicle and when so suspended and applied as a paint have the ability of forming a continuous film on the surface of the applied vehicle or paint. Such powders are produced by treating small pieces of metal in a stamping mill with subsequent screening and polishing. It has been found that some aging is required to obtain the best leafing action of the powders. The metallic leafing powders which we have found to be practical and effective in the formulations of the invention include:

Aluminum leafing powder
Aluminum bronze leafing powder
Gold bronze leafing powder
Copper bronze leafing powder
Lead leafing powder
Nickel leafing powder
Stainless steel leafing powder (18 : 8 chromium-nickel)
Silver leafing powder
Gold leafing powder
Copper leafing powder Excellent results have been obtained by employing aluminum leafing powder of such fineness that not more than 2% is retained on a Number 325 sieve and by employing aluminum bronze leafing powder, gold bronze leafing powder and copper bronze leafing powder of such fineness that not more than 0.3% is retained on a Number 100 sieve. The metallic leafing powders employed individually or in appropriate mixtures may be used in the proportion of from $\frac{1}{8}$ to 7½ grams for each 30 grams of the alkyd resin in the polyisocyanate-alkyd resin reactant mixture.

Excellent results have been obtained when both a metallic soap powder and a metallic leafing powder are incorporated in the polyisocyanate-alkyd resin mixture. The combination of the fillers appears to act synergistically, that is the combination of the metallic soap powder and the metallic leafing powder causes the formation of a greater volume of the cellular plastic than if the same proportionate quantity of each individual filler is used separately in the identical polyisocyanate-alkyd resin reactant mixture. When both the metallic leafing powders and the metallic soap powders are used in the formulations of the invention, the metallic leafing powder may be employed in the proportion of from $\frac{1}{8}$ to 5 grams for each 30 grams of the alkyd resin and the metallic soap may be used in the proportion of from $\frac{1}{8}$ to 5 grams for each gram of the alkyd resin.

The foamed cellular plastic products of the invention may be made flame resistant and self-extinguishing when once ignited by incorporating flame retardant additives in the polyisocyanate-alkyd resin reactant mixture. The additives which we have found to be effective in rendering the cellular material flame resistant are unsaturated alkyl esters of aryl phosphonic acids, namely compounds having the general formula $$ArPO(OCH_2CR : CHR^1)_2$$

where Ar represents aryl and alkaryl hydrocarbon radicals and R and $R^1$ are hydrogen and alkyl hydrocarbon radicals. Compounds of this character are described in United States Letters Patent No. 2,425,765 issued August 19, 1947. Included in this group of compounds are:

1. Diallyl phenyl phosphonate

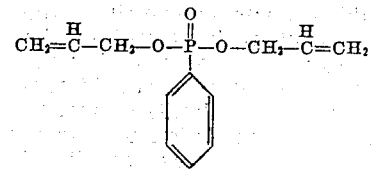

2. Bis (methallyl) benzenephosphonate

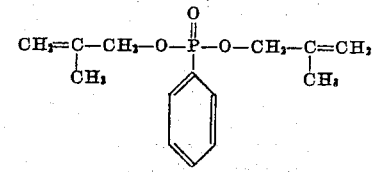

and,

3. Diallyl toluene phosphonate

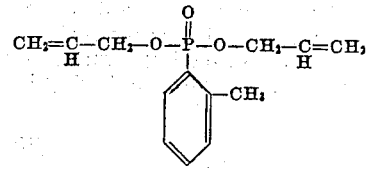

These additives not only serve to impart flame resistance and decrease flame propagation characteristics to the foamed cellular plastic product but also unexpectedly, serve to materially decrease the density of the foamed material. The proportion of the selected fire retardant and flame-proofing additive employed in the polyisocyanate-alkyd resin reactant mixture may be varied considerably but in practice from 1 gram to 20 grams of the additive may be used with each 30 grams of the alkyd resin. It is usually preferred to employ approximately 5 grams of the additive for each 30 grams of the alkyd resin.

If desired, other flame-proofing and fire-retardant agents may be employed together with or in addition to the unsaturated alkyl esters of aryl phosphonic acids described above. Such fire retardant and flame-proofing agents include trichloralkyl phosphates of the general formula:

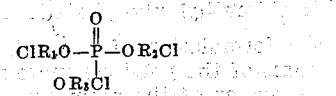

where $R_1$, $R_2$ and $R_3$ are alkyl groups having from 2 to 4 carbon atoms, antimony oxide $Sb_2O_3$ and unsaturated alkyl esters of the alkenyl phosphonic acids of the class described in United States Letters Patent No. 2,425,766, issued August 19, 1947, namely compounds having the general formula: $R^2R^3C:CR^4PO(OCH_2CR:CHR^1)_2$ where R, $R^1$ and $R^4$ are hydrogen or alkyl, and $R^2$ and $R^3$ are hydrogen, alkyl or aryl radicals.

Examples of the tri-chloralkyl phosphates which we have found to be effective in the formulations of the invention are:

Tri-B-chlorethyl phosphate

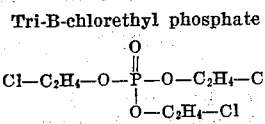

and

Trichlorpropyl phosphate $(Cl-C_3H_7-O)_3-PO$

Examples of the unsaturated alkyl esters of alkenyl phosphonic acids which we have found to be practical and effective in the cellular plastic formulations are:

Diallyl isobutene phosphonate

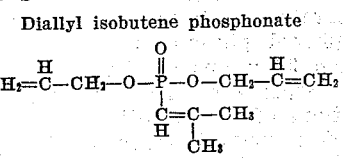

Diallyl styrene phosphonate

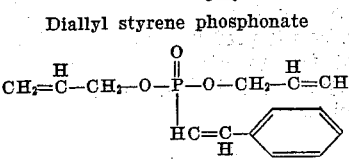

and

Bis (methallyl) styrene phosphonate

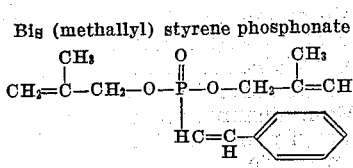

The unsaturated alkyl esters of aryl phosphonic acids, the unsaturated alkyl esters of alkenyl phosphoric acids and the tri chloralkyl phosphates serve to facilitate mixing of the alkyd resin and the diisocyanate by acting as mutual solvents for both the alkyd resin and the meta-toluene diisocyanate which tends to avoid premature reaction, prior to pouring, due to long mixing time. This is important as it permits the utilization of higher water content alkyd resins which, in turn, can result in a lowered density of the foamed plastic product. The antimony oxide, in addition to serving as a flame-proofing agent, acts as a cell size regulator whereby the cells of the foamed plastic are of smaller size. The unsaturated alkyl esters of alkenyl phosphonic acids may be used in the proportion of from 1 to 20 grams for each 30 grams of the alkyd resin when employed without the unsaturated alkyl esters of aryl phosphonic acids previously named. The tri chloralkyl phosphates may be used in the proportion of from ½ to 10 grams for each 30 grams of the alkyd resin and when used with unsaturated alkyl esters of aryl phosphonic acids in the proportion above set forth, may be used in the proportion of ½ to 7½ grams for each 30 grams of alkyd resin. The antimony oxide may be employed in the proportion of from ¼ to 5 grams for each 30 grams of the alkyd resin with or without the addition of the unsaturated alkyl esters of aryl phosphonic acid or the tri chloralkyl phosphates.

The following are typical illustrative examples of the polyisocyanate-alkyl formulations of the invention productive of low density cellular foamed plastic materials characterized by small uniform cells and superior physical properties:

Example 1

| | Grams |
|---|---|
| Alkyd resin of Formula A having an acid number of 16 and a water content of 0.56% by weight | 30 |
| Polyisocyanate reagent of Example I | 20 |
| Zinc stearate | ½ |

In Example 1, from 10 to 40 grams of the polyisocyanate reagent and from 1/8 to 7½ grams of the zinc stearate may be used with each 30 grams of the alkyd resin.

Example 2

| | Grams |
|---|---|
| Alkyd resin of Formula C having an acid number of 20 and a water content of 0.85% by weight | 30 |
| Polyisocyanate reagent of Example I | 20 |
| Aluminum stearate powder | 1 |

In this formulation, 10 to 40 grams of the polyisocyanate reagent and from 1/8 to 7½ grams of the aluminum stearate powder may be used with each 30 grams of the alkyd resin.

Example 3

| | Grams |
|---|---|
| Alkyd resin of Formula A having an acid number of 16 and a water content of 0.56% by weight | 30 |
| Polyisocyanate reagent of Example II | 20 |
| Magnesium hydroxy stearate powder | 1 |

In Example 3 from 10 to 40 grams of the polyisocyanate reagent and from 1/8 to 7½ grams of the magnesium hydroxy stearate powder may be used with each 30 grams of the alkyd resin.

Example 4

| | Grams |
|---|---|
| Alkyd resin of Formula C having an acid number of 20 and a water content of 0.85% by weight | 30 |
| Polyisocyanate reagent of Example III | 20 |
| Calcium stearate powder | 1 |

In Example 4, from 10 to 40 grams of the polyisocyanate reagent and from 1/8 to 7½ grams of the calcium stearate powder may be used for each 30 grams of the alkyd resin.

Example 5

| | Grams |
|---|---|
| Alkyd resin of Formula A having an acid number of 16 and a water content of 0.56% by weight | 30 |
| Polyisocyanate reagent of Example IV | 20 |
| Zinc stearate powder | ¾ |
| Calcium stearate powder | ¼ |

It will be observed that in Example 5, the formulation incorporates a mixture or combination of metallic soap powders.

Example 6

| | Grams |
|---|---|
| Alkyd resin of Formula C having an acid number of 20 and a water content of 0.85% by weight | 30 |
| Polyisocyanate reagent of Example V | 20 |
| Aluminum leafing powder of No. 422 Mesh | ½ |

In Example 6, from 10 to 30 grams of the polyisocyanate reagent and from ⅛ to 7½ grams of the aluminum leafing powder may be used with each 30 grams of the alkyd resin.

Example 7

| | Grams |
|---|---|
| Alkyd resin of Formula E having an acid number of 14 and a water content of 0.75% by weight | 30 |
| Polyisocyanate reagent of Example VI | 20 |
| Aluminum leafing powder of No. 422 Mesh | 1½ |

Example 8

| | Grams |
|---|---|
| Alkyd resin of Formula F having an acid number of 30 and a water content of 1.0% by weight | 30 |
| Polyisocyanate reagent of Example VII | 20 |
| Copper lining powder | 1 |

Example 9

| | Grams |
|---|---|
| Alkyd resin of Formula H having an acid number of 40 and a water content of 0.60% by weight | 30 |
| Polyisocyanate reagent of Example VI | 20 |
| Stainless steel lining powder | 1 |

Example 10

| | Grams |
|---|---|
| Alkyd resin of Formula A having an acid number of 16 and a water content of 0.56% by weight | 30 |
| Polyisocyanate reagent of Example I | 20 |
| 422 Mesh aluminum leafing powder | 1 |
| Zinc stearate powder | ¼ |

In Example 10, from 10 to 40 grams of the polyisocyanate reagent, from ⅟₁₆ to 5 grams of the aluminum leafing powder, and from ⅟₁₆ to 5 grams of the zinc stearate powder may be used for each 30 grams of the alkyd resin.

Example 11

| | Grams |
|---|---|
| Alkyd resin of Formula C having an acid number of 20 and a water content of 0.85% by weight | 30 |
| Polyisocyanate reagent of Example V | 20 |
| Strontium stearate powder | 0.75 |
| 422 Mesh aluminum leafing powder | 0.75 |

Example 12

| | Grams |
|---|---|
| Alkyd resin of Formula A having an acid number of 16 and a water content of 0.56% by weight | 30 |
| Polyisocyanate reagent of Example I | 20 |
| Zinc stearate powder | ½ |
| Diallyl phenyl phosphonate | 5 |

In Example 12 from 10 to 40 grams of the polyisocyanate reagent, from ⅟₁₆ to 7½ grams of the zinc stearate powder, and from 1 to 20 grams of the diallyl phenyl phosphonate may be used with each 30 grams of the alkyd resin.

Example 13

| | Grams |
|---|---|
| Alkyd resin of Formula A having an acid number of 12 and a water content of 0.75% by weight | 30 |
| Polyisocyanate reagent of Example II | 20 |
| Aluminum stearate powder | 1 |
| Tri-B-chlorethyl phosphate | 2½ |

In the formulation of Example 13, from 10 to 40 grams of the polyisocyanate reagent, from ⅟₁₆ to 7½ grams of the aluminum stearate powder and from ½ to 10 grams of the tri-B-chlorethyl phosphate may be used for each 30 grams of the alkyd resin.

Example 14

| | Grams |
|---|---|
| Alkyd resin of Formula L having an acid number of 50 and a water content of 1.25% by weight | 30 |
| Polyisocyanate reagent of Example III | 23 |
| Zinc stearate powder | 1 |
| Antimony oxide powder | 2½ |

Example 15

| | Grams |
|---|---|
| Alkyd resin of Formula A having an acid number of 16 and a water content of 0.56% by weight | 30 |
| Polyisocyanate reagent of Example I | 20 |
| Zinc stearate powder | 1 |
| Diallyl phenyl phosphonate | 5 |
| Benzoyl peroxide | ¼ |

In Example 15, from 10 to 40 grams of the polyisocyanate reagent, from ⅟₁₆ to 7½ grams of the zinc stearate and from 1 to 20 grams of the diallyl phenyl phosphonate may be employed with each 30 grams of the alkyd resin. The benzoyl peroxide employed in this and other formulations of the invention for obtaining fire retardant foamed cellular materials is preferably predissolved in the fire retardant additive and its proportion is preferably approximately 5% by weight of the unsaturated alkyl esters of the aryl phosphonic acids or of the alkenyl phosphonic acids.

Example 16

| | Grams |
|---|---|
| Alkyd resin of Formula E having an acid number of 30 and a water content of 1.5% by weight | 30 |
| Polyisocyanate reagent of Example VI | 22½ |
| No. 422 Mesh aluminum leafing powder | 1½ |
| Diallyl phenyl phosphonate | 3 |
| Benzoyl peroxide | 0.15 |

Example 17

| | Grams |
|---|---|
| Alkyd resin of Formula A having an acid number of 16 and a water content of 0.56% by weight | 30 |
| Polyisocyanate reagent of Example I, having an amine equivalent of 105 | 20 |
| No. 422 Mesh aluminum leafing powder | 2 |
| Zinc stearate powder | ¼ |
| Diallyl phenyl phosphonate | 5 |
| Benzoyl peroxide | ¼ |

Example 18

| | Grams |
|---|---|
| Alkyd resin of Formula A having an acid number of 14 and a water content of 0.75% by weight | 30 |
| Polyisocyanate reagent of Example IV, having an amine equivalent of 110 | 20 |
| No. 422 Mesh aluminum leafing powder | 0.75 |
| Diallyl phenyl phosphonate | 5 |
| Zinc stearate powder | 0.75 |
| Benzoyl peroxide | ¼ |

Example 19

| | Grams |
|---|---|
| Alkyd resin of Formula C having an acid number of 20 and a water content of 0.85% by weight | 30 |
| Polyisocyanate reagent of Example I, having an amine equivalent of 105 | 20 |
| Zinc stearate powder | 1½ |
| Diallyl phenyl phosphonate | 5 |
| Benzoyl peroxide | ¼ |

Example 20

| | Grams |
|---|---|
| Alkyd resin of Formula A having an acid number of 16 and a water content of 1.1% by weight | 30 |
| Polyisocyanate reagent of Example VI having an amine equivalent of 155 | 20 |
| Zinc stearate powder | 2 |
| Diallyl phenyl phosphonate | 5 |
| Benzoyl peroxide | ¼ |

Example 21

| | Grams |
|---|---|
| Alkyd resin of Formula C having an acid number of 20 and a water content of 0.85% by weight | 30 |
| Polyisocyanate reagent of Example VI having an amine equivalent of 155 | 20 |
| Zinc stearate powder | 1.0 |
| Diallyl phenyl phosphonate | 5 |
| Benzoyl peroxide | ¼ |

Example 22

| | Grams |
|---|---|
| Alkyd resin of Formula C having an acid number of 20 and a water content of 0.85% by weight | 30 |
| Polyisocyanate reagent of Example I having an amine equivalent of 105 | 20 |
| No. 422 Mesh aluminum leafing powder | ¼ |
| Zinc stearate powder | 1½ |
| Diallyl phenyl phosphonate | 5 |
| Benzoyl peroxide | ¼ |

Example 23

| | Grams |
|---|---|
| Alkyd resin of Formula C having an acid number of 20 and a water content of 0.85% by weight | 30 |
| Polyisocyanate reagent of Example I having an amine equivalent of 120 | 20 |
| Zinc stearate powder | 1½ |
| Diallyl phenyl phosphonate | 5 |
| Benzoyl peroxide | ¼ |

Example 24

| | Grams |
|---|---|
| Alkyd resin of Formula C having an acid number of 20 and a water content of 0.85% by weight | 30 |
| Polyisocyanate reagent of Example I having an amine equivalent of 145 | 20 |
| Zinc stearate powder | 1½ |
| Diallyl phenyl phosphonate | 5 |
| Benzoyl peroxide | ¼ |

Example 25

| | Grams |
|---|---|
| Alkyd resin of Formula C having an acid number of 20 and a water content of 0.85% by weight | 30 |
| Polyisocyanate reagent of Example VII having an amine equivalent of 105 | 20 |
| Zinc stearate powder | 1½ |
| Diallyl phenyl phosphonate | 5 |
| Benzoyl peroxide | ¼ |

In the formulations of Examples 16 to 25, the ranges of proportions of the polyisocyanate reagent, metallic leafing powders, metallic soap powders and the flame-proofing and fire retardant agents may be substantially the same as in the foregoing examples.

In carrying out the method of the invention in the preparation of the foamed cellular plastic materials, the selected high molecular weight polyisocyanate reagent and the selected alkyd resin are first obtained or produced in accordance with the above disclosure. The reagent and the other ingredients of the desired formulation are then simply mixed thoroughly in the ratio designed to produce the foamed plastic having the desired density, etc. This mixture is then poured into the mold or cavity in the structure in which it is to form a part or is applied to a structural surface, or the like, and is allowed to react at atmospheric pressure either with or without the application of external heat or attended by a moderate heating of, say, between 120° F. and 150° F. depending upon the size of the batch. The mixture is merely allowed to react and the reaction is permitted to go on to completion to produce the foamed cellular product. A post-curing operation of from 10 to 20 hours at a temperature of from 125° F. to 225° F. may be desirable to continue the polymerization of the reaction and thus obtain a stronger, more heat stable and more solvent resistant material. The foamed cellular plastic material obtained by the method has a substantially uniform cellular structure throughout characterized by small non-communicating cells of uniform size and configuration.

It should be understood that the invention is not based upon or dependent upon the theories which we have expressed. Nor is the invention to be regarded as limited to the express procedure or material set forth, these details being given only by way of illustration and to aid in clarifying the invention. We do not regard such specific details as essential to the invention except insofar as they are expressed by way of limitation in the following claims in which it is our intention to claim all novely inherent in the invention as broadly as is permissible in view of the prior art.

We claim:

1. A foamed cellular plastic material which comprises the reaction product of an alkyd resin having an acid number of from 5 to 80 and a water content of from 0.1% to 3% by weight and wherein the hydroxyl and carboxyl groups in the alkyd resin reactants are in the ratio of from 3(OH) : 1(COOH) to 4(OH) : 5(COOH); a meta-toluene diisocyanate solution containing as foam stabilizing agents high molecular weight polyisocyanate reaction products obtained by the reaction of materials consisting of one mol of meta-toluene diisocyanate and from approximately 0.01 to approximately 0.25 mol of a compound having two functional groups each of which contains a hydrogen atom that reacts with meta-toluene diisocyanate by addition polymerization, and the diisocyanate-polyisocyanate solution having an amine equivalent of between 100 and 175 and a metallic soap powder chosen from the group consisting of:

Zinc stearate        Strontium stearate
Aluminum stearate    Magnesium hydroxystearate
Calcium stearate     Zinc laurate
Magnesium stearate   Calcium oleate
Barium stearate in proportion of from 35 to 150 parts by weight of said solution and from 0.21 to 25 parts by weight of said metallic soap powder for each 100 parts by weight of said alkyd resin.

2. A foamed cellular plastic material comprising the reaction product of an alkyd resin having a water content of from 0.1% to 3% by weight, an acid number of from 5 to 80 and wherein the hydroxyl and carboxyl groups of the alkyd resin reactants are in the ratio range of from 3(OH) : 1(COOH) to 4(OH) : 5(COOH), and from 35 to 150 parts by weight for each 100 parts by weight of said resin of a metatoluene diisocyanate solution containing as foam stabilizing agents high molecular weight polyisocyanate reaction products obtained by the reaction of materials consisting of one mol of meta-toluene diisocyanate and from approximately 0.01 to 0.25 mol of a compound having two functional groups each of which contains a hydrogen atom that reacts with meta-toluene diisocyanate by addition polymerization, and the diisocyanate-polyisocyanate solution having an amine equivalent of between 100 and 175, and from 0.4 to 25 parts by weight to each 100 parts by weight of said alkyd resin of a metal leafing powder chosen from the group consisting of:

Aluminum leafing powder
Aluminum bronze leafing powder
Gold bronze leafing powder
Copper bronze leafing powder
Lead leafing powder
Nickel leafing powder
Silver leafing powder
Gold leafing powder
Copper leafing powder
Stainless steel leafing powder.

3. A foamed cellular plastic material comprising the reaction product on an approximate weight basis of an alkyd resin having a water content of from 0.1% to 3% by weight and an acid number of from 5 to 80 and wherein the hydroxyl and carboxyl groups in the alkyd resin reactants are in the ratio range of from

3(OH) : 1(COOH)

to 4(OH) : 5(COOH) and from 10 to 40 grams for each 30 grams of said resin of a product obtained by the reaction of materials consisting of one mol of meta-toluene diisocyanate and from 0.01 to 0.25 mol 2 methyl, 2-4 pentanediol, said products having an amine equivalent of between 100 and 175, and from 0.21 to 25 parts by weight for each 100 parts by weight of said alkyd resin of a metallic soap powder chosen from the group consisting of:

Zinc stearate        Strontium stearate
Aluminum stearate    Magnesium hydroxy-
Calcium stearate        stearate
Magnesium stearate   Zinc laurate
Barium stearate      Calcium oleate.

4. The foamed cellular plastic material which comprises the reaction product of an alkyd resin having an acid number of from 5 to 80 and a water content of from 0.1% to 3% by weight prepared from glycerol, adipic acid and phthalic anhydride in the proportion of from 3 to 5 mols glycerol, from 1.5 to 3 mols adipic acid and from 0.1 to 1.5 mols phthalic anhydride; a meta-toluene diisocyanate solution containing as foam stabilizing agents high molecular weight reaction products obtained by the reaction of materials consisting of one mol of meta-toluene diisocyanate and approximately 0.01 to approximately 0.25 mol of a compound having two functional groups each of which contains a hydrogen atom that reacts with meta-toluene diisocyanate by addition polymerization, and the diisocyanate-polyisocyanate solution having an amine equivalent of between 100 and 175; and a metallic soap powder chosen from the group consisting of:

Zinc stearate        Strontium stearate
Aluminum stearate    Magnesium hydroxy-
Calcium stearate        stearate
Magnesium stearate   Zinc laurate
Barium stearate      Calcium oleate in the approximate proportion of from 35 to 150 parts by weight of said polyisocyanate solution and from 0.21 to 25 parts by weight of said metallic soap powder for each 100 parts by weight of said alkyd resin.

5. A foamed cellular plastic material comprising the reaction product of an alkyd resin having an acid number of from 5 to 80 and a water content of from 0.1% to 3% by weight and wherein the hydroxyl and carboxyl groups in the alkyd resin reactants are in the ratio range of from 3(OH) : 1(COOH) to 4(OH) : 5(COOH) ; and a product obtained by the reaction of materials consisting of one mol of meta-toluene diisocyanate and from 0.01 to 0.25 mol 2 methyl, 2-4 pentanediol, said product having an amine equivalent of approximately 120 and a metal leafing powder in the approximate proportion of from 35 to 150 parts by weight of said product and from 0.4 to 25 parts by weight of said leafing powder for each 100 parts by weight of said alkyd resin.

6. A foamed cellular plastic material comprising the reaction product of an alkyd resin having an acid number of from 5 to 80 and a water content of from 0.1% to 3% by weight and wherein the hydroxyl and carboxyl groups in the alkyd resin reactants are in the ratio range of from 3(OH) : 1(COOH) to 4(OH) : 5(COOH) and a product obtained by the reaction of materials consisting of one mol of meta-toluene diisocyanate and from 0.01 to 0.25 mol O-dihydroxybenzene, said product having an amine equivalent of between 100 and 175; and a metallic soap powder chosen from the group consisting of:

Zinc stearate        Strontium stearate
Aluminum stearate    Magnesium hydroxy-
Calcium stearate        stearate
Magnesium stearate   Zinc laurate
Barium stearate      Calcium oleate in the approximate proportion of from 35 to 100 parts by weight of said reagent and from 0.4 to 25 parts by weight of said metallic soap powder for each 100 parts by weight of said alkyd resin.

7. A foamed cellular plastic material comprising the reaction product on an approximate weight basis of an alkyd resin having a water content of from 0.1% to 3% by weight prepared from glycerol, adipic acid and phthalic anhydride in the proportion of from 3 to 5 mols glycerol, from 1.5 to 3 mols adipic acid and from 0.1 to 1.5 mols phthalic anhydride, from 10 to 40 grams for each 30 grams of said resin of a product obtained by the reaction of materials consisting of one mol of meta-toluene diisocyanate and from 0.01 to 0.25 mol 2 methyl, 2-4 pentanediol, and from 0.21 to 25 parts by weight for each 100 parts by weight of said alkyd resin of a metallic soap powder chosen from the group consisting of:

Zinc stearate
Aluminum stearate
Calcium stearate
Magnesium stearate
Barium stearate
Strontium stearate
Magnesium hydroxy-stearate
Zinc laurate
Calcium oleate.

8. A foamed cellular plastic material comprising the reaction product on an approximate weight basis of an alkyd resin having a water content of from 0.1% to 3% by weight prepared from 4 mols trimethylol propane, 2.5 mols adipic acid and 0.5 mol phthalic anhydride and having an acid number of from 5 to 80; from 10 to 40 grams for each 30 grams of said alkyd resin of a product obtained by the reaction of materials consisting of one mol of meta-toluene diisocyanate and from 0.01 to 0.25 mol of 2 methyl, 2-4 pentanediol, said product having an amine equivalent of between 100 and 175; and from 0.4 to 25 parts by weight for each 100 parts by weight of said resin of a metallic soap powder chosen from the group consisting of:

Zinc stearate
Aluminum stearate
Calcium stearate
Magnesium stearate
Barium stearate
Strontium stearate
Magnesium hydroxystearate
Zinc laurate
Calcium oleate 9. A foamed cellular plastic material comprising the reaction product of an alkyd resin having a water content of from 0.1% to 3% by weight, an acid number of from 5 to 80 and wherein the hydroxyl and carboxyl groups of the alkyd resin reactants are in the ratio range of from $$3(OH):1(COOH)$$

to 4(OH) : 5(COOH) from 35 to 150 parts by weight for each 100 parts by weight of said resin of a metatoluene diisocyanate solution containing high molecular weight polyisocyanate reaction products obtained by the reaction of materials consisting of one mol of meta-toluene diisocyanate and approximately 0.01 to approximately 0.25 mol of a compound having two functional groups each of which contains a hydrogen atom that reacts with meta-toluene diisocyanate by addition polymerization, the diisocyanate polyisocyanate solution having an amine equivalent of between 100 and 175, from 0.21 to 16.5 parts by weight to each 100 parts by weight of said alkyd resin of a metal leafing powder chosen from the group consisting of:

Aluminum leafing powder
Aluminum bronze leafing powder
Gold bronze leafing powder
Copper bronze leafing powder
Lead leafing powder
Nickel leafing powder
Silver leafing powder
Gold leafing powder
Copper leafing powder
Stainless steel leafing powder and from 0.21 to 16.5 parts by weight to each 100 parts by weight of said alkyd resin of a metallic soap powder chosen from the group consisting of:

Zinc stearate
Aluminum stearate
Calcium stearate
Magnesium stearate
Barium stearate
Strontium stearate
Magnesium hydroxystearate
Zinc laurate
Calcium oleate 10. A foamed cellular plastic material comprising the reaction product on an approximate weight basis of an alkyd resin having a water content of from 0.1% to 3% by weight prepared from 4 mols trimethylol propane, 2.5 mols adipic acid and 0.5 mol phthalic anhydride and having an acid number of from 5 to 80; from 10 to 40 grams for each 30 grams of said alkyd resin of a product obtained by the reaction of materials consisting of approximately one mol of meta-toluene diisocyanate and from approximately 0.01 to approximately 0.25 mol of a compound having two functional groups each of which contains a hydrogen atom that reacts with the meta-toluene diisocyanate by addition reaction, the diisocyanate-polyisocyanate solution having an amine equivalent of between 100 and 175, and from 0.4 to 0.25 part by weight for each 100 parts by weight of said resin of a metallic soap powder chosen from the group consisting of:

Zinc stearate
Aluminum stearate
Calcium stearate
Magnesium stearate
Barium stearate
Strontium stearate
Magnesium hydroxystearate
Zinc laurate
Calcium oleate 11. A foamed cellular plastic material comprising the reaction product of an alkyd resin having a water content of from 0.1% to 3% by weight, an acid number of from 5 to 80 and wherein the hydroxyl and carboxyl groups of the alkyl resin reactants are in the ratio range of from 3(OH) : 1(COOH) to 4(OH) : 5(COOH), from 35 to 150 parts by weight for each 100 parts by weight of said resin of a meta-toluene diisocyanate solution containing high molecular weight polyisocyanate reaction products obtained by the reaction of materials consisting of one mol of meta-toluene diisocyanate and approximately 0.01 to approximately 0.25 mol of a compound having two functional groups each of which contains a hydrogen atom that reacts with the meta-toluene diisocyanate by addition polymerization, and the diisocyanate-polyisocyanate solution having an amine equivalent of between 100 and 175, from 0.21 to 16.5 parts by weight to each 100 parts by weight of said alkyd resin of a metal leafing powder, from 0.21 to 16.5 parts by weight to each 100 parts by weight of said alkyd resin of a metallic soap powder chosen from the group consisting of:

Zinc stearate
Aluminum stearate
Calcium stearate
Magnesium stearate
Barium stearate
Strontium stearate
Magnesium hydroxystearate
Zinc laurate
Calcium oleate and from 3.33 to 66.6 parts by weight of an unsaturated alkyl ester of aryl phosphonic acids of the general formula $ArPO(OCH_2CR:CHR^1)_2$ where Ar represents a radical selected from the group consisting of aryl and alkaryl hydrocarbon radicals and where R and R¹ represents radicals selected from the group consisting of H and alkyl hydrocarbon radicals.

ELI SIMON.
FRANK W. THOMAS.

REFERENCES CITED

The following references are of record in the file of this patent:

UNITED STATES PATENTS

| Number | Name | Date |
|---|---|---|
| 2,425,765 | Toy | Aug. 19, 1947 |
| 2,443,566 | Loveland | June 15, 1948 |
| 2,461,761 | Nye | Feb. 15, 1949 |

OTHER REFERENCES

De Bell et al.: "German Plastics Practice," pages 300, 301, 310 to 316 and 463 to 465. Published by De Bell and Richardson, Springfield, Mass., 1946.